United States Patent [19]

Tollison, Jr.

[11] Patent Number: 5,171,483
[45] Date of Patent: Dec. 15, 1992

[54] METHOD FOR RETRIEVABLE/PERMANENT STORAGE OF HAZARDOUS WASTE MATERIALS

[75] Inventor: James B. Tollison, Jr., Albuquerque, N. Mex.

[73] Assignee: Science Applications International Corporation, San Diego, Calif.

[21] Appl. No.: 701,393

[22] Filed: May 16, 1991

[51] Int. Cl.[5] .............................................. G21F 9/16
[52] U.S. Cl. .................................... 252/628; 405/128; 252/633; 250/506.1; 250/507.1; 376/272
[58] Field of Search ............... 252/633, 628; 405/128; 250/506.1, 507.1; 376/272

[56] References Cited

U.S. PATENT DOCUMENTS

| | | | |
|---|---|---|---|
| 4,481,165 | 11/1984 | Anderson et al. | 376/272 |
| 4,681,706 | 7/1987 | Mallory et al. | 252/633 |
| 4,701,280 | 10/1987 | Canevall | 252/633 |
| 4,776,982 | 10/1988 | Canevall | 252/633 |
| 4,784,802 | 11/1988 | Mallory et al. | 252/633 |
| 4,842,774 | 6/1989 | Golden | 252/633 |
| 4,844,840 | 7/1989 | Feizollahi | 252/633 |
| 4,906,135 | 3/1990 | Brassow et al. | 405/128 |
| 4,935,943 | 6/1990 | Schweitzer et al. | 376/272 |
| 4,950,426 | 8/1990 | Markowitz et al. | 252/633 |

OTHER PUBLICATIONS

Zolenek Dlouhy, Disposal of Radioactive Wastes, Studies in Environmental Science 15, Section 9.3, pp. 220-223.

Primary Examiner—Donald P. Walsh
Assistant Examiner—Ngoclan T. Mai
Attorney, Agent, or Firm—Fitch, Even, Tabin & Flannery

[57] ABSTRACT

A method for the long term storage of radioactive hazardous waste in a hollowed out chamber of salt bed in which sealed, relatively incompressible containers of hazardous materials are immobilized in a regular spaced array with the remaining space in the chamber filled with a granular compressive load equalization medium.

8 Claims, 1 Drawing Sheet

METHOD FOR RETRIEVABLE/PERMANENT STORAGE OF HAZARDOUS WASTE MATERIALS

BACKGROUND OF THE INVENTION

1. Field of the Invention

The present invention relates generally to the field of hazardous waste containment and disposal and, particularly to a method of long term storage which allows, when necessary, easy retrieval of the stored waste material.

2. Description of the Problem

Hazardous wastes include a variety of toxic and radioactive materials which have the capacity to cause considerable harm if released directly into the environment. The various types of hazardous waste materials and methods for storing or otherwise disposing of them ar defined generally in regulations and other documents issued either by the various state or federal agencies concerned with environmental safety. Federal agencies involved in this activity include the Environmental Protection Agency (EPA), the Occupational Health and Safety Agency (OSHA) and, where radioactive materials are involved, the Nuclear Regulatory Commission (NRC), a part of the Department of Energy (DOE).

With respect to radioactive wastes, NRC has established a number of classes with respect to the containment and disposal requirements therefor as follows:

Class A: mildly hazardous "segregated" wastes for which there are no stability requirements but which must be disposed of in a segregated manner from other waste materials. Class A wastes are defined in terms of maximum allowable concentrations of certain isotopes and are subject to certain minimum requirements regarding waste form and packaging for safe handling. Typical materials falling in this category are gloves and other protective clothing worn by workers in nuclear facilities, contaminated animal carcasses and laboratory equipment, all of which are generally contaminated with an average level of radioactivity of about 0.1 curies per cubic foot. It has been reported that in 1988 alone over two million cubic feet of such waste materials were produced.

Class B: hazardous "stabilized" waste having higher levels of radioactivity and a need to be placed in a stable form and disposed of in a segregated manner from unstable waste materials. Class B wastes include materials such as piping, pumps and valves from nuclear reactor facilities, radium contaminated waste tailings from uranium mines and similar materials. Materials in Class B are also defined in terms of maximum allowable concentrations of certain isotopes and requirements for a stable waste form as well as minimum handling requirements.

Class C: extremely hazardous "Intruder protected" waste materials which need to be placed in a stable form, disposed of in a segregated manner from nonstabilized waste forms and then disposed of in such a manner that a barrier is provided against potential inadvertent intrusion and contact after institutional controls have lapsed. Class C waste materials are also defined in terms of maximum allowable concentrations of certain isotopes and typically comprise items such as spent fuel rods, safety and control rods, core barrels, items directly exposed to primary coolant, and other wastes contaminated with radium, thorium, uranium or one or more transuranic elements. In the case of spent fuel rods, radiation levels in excess of 200,000 curies per cubic foot may be encountered. Because of the great volume and extremely long half lives of some of these materials, the mode of disposal most commonly proposed involves the "immobilizing" of the waste materials and their deep burial for very long periods of time. The time period of such burial depends upon the amount of radiation involved and the isotopic half lives of the stored material with a period of 10,000 years presently being required for the most highly radioactive materials, such as spent fuel rods and similar materials. As a practical matter, this means that such containment and storage would be considered as being permanent.

To achieve this degree of storage, a variety of approaches have been proposed. One method of immobilizing these waste materials comprises grinding or shredding them, along with the containers used to hold them, and then incorporating the shredded materials into a solid matrix such as concrete for burial underground. While encapsulation of the containers in concrete would appear to provide the necessary level of long term stability, a concrete sheath can fail from earth movement resulting from earthquakes, earth subsidence and the like. Such earth movements frequently can fracture even the most solid containment matrixes over a long period of time. Furthermore, fracture can also occur as a result of the internal pressure developed by the expansion and dehydration of the stored material as it is heated by radioactive decay, and by the release of various gases such as steam, radon and helium by the decay process.

It has also been suggested in U.S. Pat. No. 4,701,280 that the most highly radioactive materials be permanently stored at great depth in specially designed chambers hollowed out under primary rock. However, primary rock contains cracks and cavities and often also aquifers. The rock can also be subjected to deformation, for example, from earthquakes and other seismic activity, earth subsidence and the like. Consequently, there is at least some degree of risk that such deformations, combined with any corrosion resulting from contact of the radioactive materials storage containers with any ground water seeping into the chambers holding such waste, will cause the waste containers to rupture and allow the released materials to spread without control.

Other methods of hazardous waste containment are described in U.S. Pat. Nos. 4,784,802 and 4,844,840 and include the placement of arrays of waste-containing modules in an earthen trench or depression covered by a non-rigid cap or earthen cover. Such storage configurations are sensitive to earthquakes and require special structures for handling the seepage of ground water.

Most recently, the DOE has proposed storing large quantities of high level radioactive materials in deep chambers hollowed out in salt beds underlying large areas of the western United States. Such beds are thought to be relatively free of long term problems resulting from siemic activity and ground water seepage. To determine the long term viability of this approach to storing high level wastes, work has been started to design and construct a waste isolation pilot plant (WIPP) which will study and define the problems involved in storing up to about 6,000,000 cubic feet of radioactive waste materials for extremely long periods of time. It is contemplated that this facility will, within a period of about 50 years, demonstrate the utility of one or more methods for achieving compliance with the presently allowable radioactive isotope release limits over a 10,000 year period.

At the present time, however, none of the previously referred to approaches to waste containment appears useful in the WIPP facility. This is due to the natural plastic flow of salt within the salt beds in which the waste containing chambers will be formed and the need to provide for periodic inspection of the waste holding containers over the 50 year test period to verify the continued safety and utility of the waste containment structures. The natural flow of salt within the salt bed will result in extremely high compressive forces on the waste holding containers, much greater than those contemplated in the previously proposed approaches to waste containment. Furthermore, it is contemplated that over a period of about 50 years, the salt flow will progress to the point where it will compress the entombed containers sufficiently to lock the containers in place and cause many of them to rupture. As a result of such compression and locking, any removal, inspection or repackaging of leaking containers will become, as a practical matter, a physical impossibility. What is needed is a storage method that will distribute the compressive loads of the migrating salt and allow for retrieval, inspection and, if necessary repackaging of the waste holding containers over a time frame of sufficient duration to assess the long term performance of the salt bed depository. The present invention satisfies that need.

SUMMARY OF THE INVENTION

The present invention is a method for permanently storing radioactive waste materials in a salt bed such that long term crushing of the containers is effectively prevented, thus allowing the subsequent removal, inspection and, if necessary, the repackaging of such materials for additional storage. The method comprises inserting at least one container of radioactive waste material in a chamber hollowed out of a salt bed, followed by substantially filling the remaining volume of the chamber with a compressive load equalization system comprised of a compacted fluidized medium granulated to have a particle size up to about 2,000 microns. In the present invention the container is designed both to be able to withstand large hydrostatic pressures and to be stacked or otherwise assembled into stable arrays containing a plurality of such containers.

By employing the principles of the present invention, the tendency of the salt bed to compress and eventually crush the storage containers is significantly reduced. Also, removal of the storage containers can be accomplished at any time simply by mining out a second chamber adjacent to the filled chamber and then providing an opening of sufficient size to allow the fluidized medium to spill out, after which the remaining materials can easily be removed from the storage chamber.

DETAILED DESCRIPTION OF THE INVENTION

The present invention is a method for permanently storing radioactive waste materials in a salt bed such that long term crushing of the containers is minimized. In practicing the method of this invention, the material being stored is first placed into one or more storage containers, typically a 55 gallon steel drum or a rectilinear metal box. The manner of placement therein will depend upon the size and shape of the waste material and the level and type of radioactivity exhibited by it. The most usual storage method involves shredding the waste material, along with the original contaminated container thereof and mixing at least a portion of the shredded mixture with an amount of a cementitious mixture to form a solid, incompressible mass for subsequent storage.

The ratio of waste to cementitious mixture will depend upon several factors including the level of radioactivity, and the compressibility of the waste material.

Almost any standard cementitious mixture may be used for this purpose. Preferred however is Portland Cement which may have some gravel aggregate mixed with the cement to gain compressive strength. Similarly, any standard mixing technique may be used for this purpose, however to use of vibrators is preferred to remove any air bubbles from the mixed mass after it is poured into the final storage container. To avoid potential problems with excessive hydrostatic compression forces during subsequent long term storage, it is most important that the amount of material added be sufficient to substantially fill the entire void volume of the container before it is sealed. The amount of water used to mix and cure the concrete should be carefully monitored to avoid creating potential steam emission problems with any excess water remaining in the final mixed mass after curing. Lastly, the overall compressive strength of the drum may be significantly improved by preplacing reinforcing rods into the container, so that after the cement/radioactive mixture is poured thereinto, the cured structure will be essentially a column.

Figure 1:
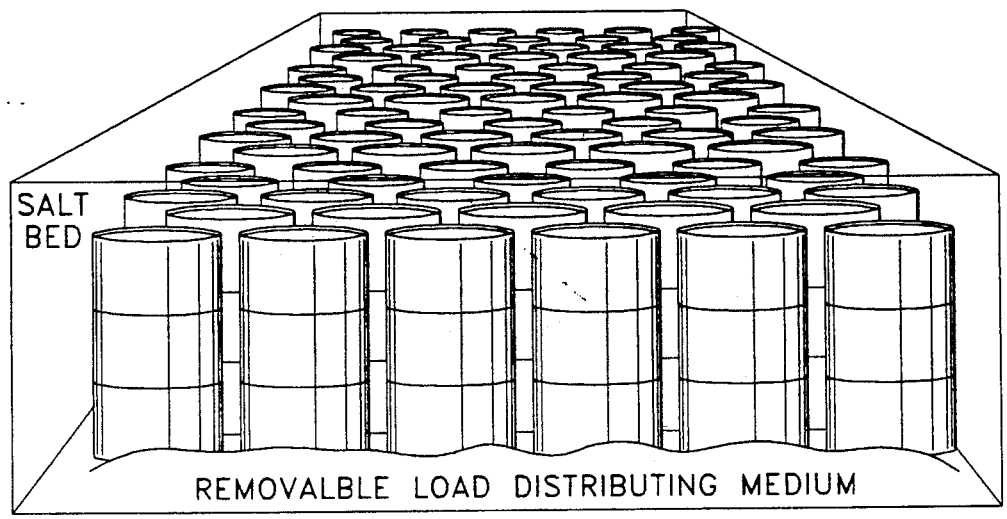
FIG. 1 is a schematic drawing showing an array of radioactive waste storage containers stacked on the floor of a hollow in a salt bed partially filled with a removable load distribution medium therein. In the method of the present invention, additional medium is added to fill the hollow before a sealing thereof.

There are no particular requirements for the size and shape of the storage containers used, other that they be adapted to withstand large compressive forces. Typically, however, 55 gallon drums are used. However, even larger capacity cylindrical drums, up to about 6 feet in diameter and 6 feet high, and rectilinear boxes up to about 4×4×6 feet in size may also be used. Containers of such size and weight can easily fit into and be transported by an NRC-certifiable Type B transportation container. Containers having other sizes and shapes may also be used. The only size and shape limitations are that they be able to fit inside the transportation container without difficulty. To avoid potential problems with corrosion, particularly chloride stress corrosion induced by any ground water reaching the salt contacting surfaces, it is preferred that the containers be made of a metal alloy resistant to such corrosive attack, such as type 316 stainless steel. Other suitable materials include copper, plastic coated sheet steel, various nickel alloys, fiber reinforced concrete and filament or tape wrapped fiberglass. After filling, these containers are sealed with a welded or plastic bonded top cover fitted with a particulate filter, usually of activated carbon, to equalize internal gas pressures. Also, the containers are preferably fitted externally with fixtures adapted to facilitate stacking of the containers to form a regularly spaced array in which, as shown in FIG. 1, a uniform distance between each of the containers in the array is maintained during backfilling operations. In addition, various measuring devices and telemetry systems to help keep track of such factors as external compressive forces, gas generation rates, internal gas pressures, corrosion rates and brine inflow into the room may be attached to the containers. Radiation monitors to help identify the occurrence and location of any leakage may also be included within the array of containers.

The final step in performing the waste storage method of the present invention is the placement of a granular load distributing medium around each of the stored containers. First, approximately a 12 inch thick layer of such a medium is spread over the floor of the storage chamber onto which the sealed storage containers are placed. After the first layer of the array of storage containers is completed, the granulated medium is provided in sufficient quantity to substantially fill all of the void volume between and around the containers. Where the array comprises more than one layer of stored sealed containers the process is repeated. When the last container is placed in the room, all of the void volume remaining in the storage chamber is then completely filled with the granulated medium.

The granules of the medium are sized to provide a uniform coupling of the compressive forces generated by the plastic flow of the salt bed towards the storage array in a manner approaching hydraulic force distribution. To achieve such a degree of utility, the particles must have a size not to exceed about 2,000 microns. Particles of such size are known to form beds which will accommodate themselves to annular spaces and to flow in approximately the same manner as a fluid under static forces. Beds of such medium are customarily identified as being "fluidized" beds and this term shall be used hereinafter to such beds. Fill materials used for this purpose include, but are not limited to, sand, bentonite, gypsum and mixtures thereof. One or more layers of such materials may also be used in forming the final fluidized bed. Bentonite is particularly preferred because it will both absorb any ground water entering the chamber and expand in so doing so as to form a dense barrier to water around each of the containers or around the array of containers. To assure maximum effectiveness of the bed packing, there should be about a three inch spacing between each of the containers and a twelve inch minimum clearance to the walls and ceiling of the chamber.

In use, the bed should be compacted using a vibratory compactor to remove any air bubbles which have been trapped during pouring of the granulated particles around the containers and to achieve both a uniform spacing distribution and a maximum packing density. Remotely operated equipment to do this is well known in the art.

Figure 2:
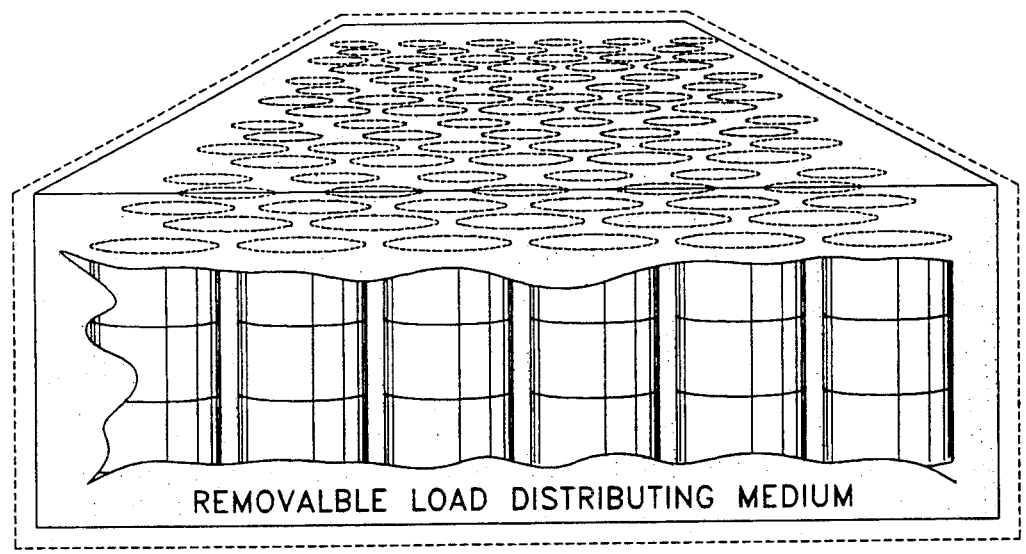
FIG. 2 is a schematic drawing showing the array of FIG. 1 in the medium filled hollow after a storage period of about 50 years.

With a granular load distribution system as described above, it is found that after the room is sealed with more of the granular medium used to surround each of the storage containers, it will only take a very short time for the loaded storage array to reach equilibrium with the lithostatic pressure of the salt formation. The expected appearance of the chamber after about 50 years of storage is shown as FIG. 2.

Removal of the stored containers for subsequent inspection is very simple. All that is necessary is to first vent any gases which may have accumulated, then remove the sealing material from the entrance to the chamber, and then remove the packed granular material from around each of the containers. Since the granular materials is still freely flowing, such removal can be done using, for example, a remotely operated vacuum hose. The stored containers may now be removed in reverse of the order in which they were placed in the chamber. Since it expected that, little, if any, radioactive material will have escaped from within the containers, the dry granulated material will itself not be "hot" and can be used over again.

It will be understood that various changes in the details, materials, arrangement and interrelationship of the various elements which have been described and illustrated in order to explain the nature of the method of the present invention, may be made by those skilled in the art without departing from the principles of the invention. Accordingly, reference should be made to the appended claims, rather than to the foregoing specification, as indicating the scope of the invention.

What is claimed is:

1. A method of long term storage of hazardous material in a hollowed out chamber in a salt bed, comprising the steps of:
    (a) placing one or more sealed, hazardous material holding containers within a fluidized bed by completely surrounding the containers with a granular load distributing medium; and
    (b) closing the chamber.

2. The method of claim 1 wherein step (a) comprises:
    spreading a layer of the granular load distributing medium over a floor of the chamber;
    placing the containers in the chamber and on the layer; and
    filling the chamber with the medium to completely surround the containers.

3. The method of claim 1 wherein the granular medium is selected from the class consisting of sand, bentonite and gypsum.

4. The method of claim 1 wherein the medium is granulated to have a particle size not to exceed about 2,000 microns.

5. The method of claim 1 further comprising the step of removing the granular load distributing medium from the chamber so that a sealed container may be inspected and/or removed from the chamber.

6. The method of claim 1 wherein in step (a) a plurality of sealed hazardous material holding containers is placed in the hollowed chamber in the form of a regularly spaced array and the fluidized bed completely surrounds the array of sealed containers.

7. A long term storage for hazardous material comprising:
    a chamber in a salt bed;
    one or more sealed containers holding the hazardous material; and
    a fluidized bed of a granular load distributing medium completely surrounding the containers and filling the chamber.

8. The storage of claim 7 wherein the sealed containers are in a closely spaced array in the chamber.

* * * * *